(12) United States Patent
Schultz

(10) Patent No.: US 6,714,398 B2
(45) Date of Patent: Mar. 30, 2004

(54) BULK DEGAUSSER WITH FIXED ARRAYS OF MAGNETIC POLES CONFIGURED FOR THICK AND SMALL FORM FACTOR, HIGH COERCIVITY MEDIA

(75) Inventor: Robert A. Schultz, Lincoln, NE (US)

(73) Assignee: Data Security, Inc., Lincoln, NE (US)

( * ) Notice: Subject to any disclaimer, the term of this patent is extended or adjusted under 35 U.S.C. 154(b) by 0 days.

(21) Appl. No.: 10/165,724

(22) Filed: Jun. 7, 2002

(65) Prior Publication Data

US 2003/0227734 A1 Dec. 11, 2003

(51) Int. Cl.$^7$ .................................................. H02H 1/00
(52) U.S. Cl. ........................ 361/134; 361/121; 361/151; 361/155; 361/187; 360/118; 360/121; 360/125
(58) Field of Search .................................. 361/134, 267, 361/149, 151, 154, 155, 90, 99, 187, 206, 210, 143, 150; 360/118, 121, 125

(56) References Cited

U.S. PATENT DOCUMENTS

| | | | | |
|---|---|---|---|---|
| 4,157,581 A | * | 6/1979 | Keiichi et al. | |
| 4,730,230 A | * | 3/1988 | Helfrick | |
| 5,132,860 A | | 7/1992 | Von Stein | |
| 5,420,742 A | * | 5/1995 | Ketcham et al. | |
| 5,466,574 A | * | 11/1995 | Liberti et al. | |
| 5,666,413 A | | 9/1997 | Kempf | |
| 5,721,665 A | * | 2/1998 | Schultz | |

* cited by examiner

Primary Examiner—Dean A. Reichard
Assistant Examiner—Nguyen T. Ha
(74) Attorney, Agent, or Firm—Fitch, Even, Tabin & Flannery

(57) ABSTRACT

A bulk degaussing apparatus and method for erasing magnetic media of various sizes. A media passage track is provided such that media passing therethrough is uniformly exposed to the magnetic fields provided through the gap. The bulk degaussing apparatus has fixed magnetic pole pairs predisposed for generating uniform magnetic field elements across a gap projecting magnetic flux across the gap for erasing various sizes of magnetic media, with the magnetic media receiving track positioned relative to the poles such that adjacent like poles are arranged on each side of the gap to counteract fringing effects. The bulk degaussing method for erasing various sizes of magnetic media provides a plurality of fixed magnetic pole pairs for generating uniform magnetic field elements on one or more sides of a degaussing region projecting magnetic flux into the region, and arranges the plurality of fixed poles so that adjacent poles counteract fringing effects. The described embodiments provide for generation of single uniform fields, and to non-interacting systems of such fields, through the application of arrays of magnetic poles having simple geometry. Specifically, the arrays address problems of magnetic field uniformity arising from prior art application of extruded magnet shapes. Additionally, the arrays involve smaller elements than would be needed for extrusions, relieving difficulties in fabrication or assembly.

12 Claims, 6 Drawing Sheets

BULK DEGAUSSER WITH FIXED ARRAYS OF MAGNETIC POLES CONFIGURED FOR THICK AND SMALL FORM FACTOR, HIGH COERCIVITY MEDIA

FIELD OF THE INVENTION

The present invention generally relates to information erasure by magnetic degaussing fields of effective strength and multi-dimensional direction applied to magnetic tapes and disks traversing a pathway. In particular, the invention relates to generating uniform magnetic field elements capable of generating and concentrating flux density fields.

BACKGROUND OF THE INVENTION

Certain problems arise in arranging an array of simple magnetic poles that generate and rotate fields across a wide gap for purposes of degaussing both tapes rated above 1000 Oersteds with small form factors and half height hard disk drives rated above 1800 Oersteds. Arrangement of unlike poles closer to each other for purposes of increasing multi-directional strength of interacting fields increases interaction between poles on the same side of the gap, at the expense of strength midway across the gap, where worst-case generally resides. Especially in the situation with hard disk drives, where the information-bearing coatings are now rising past "hard" coercivities of 3000 Oersteds, the non-uniform strength increases problems of extraction due to attraction between degaussing magnets and "soft" ferromagnetic motors of the drives.

The prior art of cladding electric windings with iron cores or surrounding cores with windings to produce pairs of like-poles facing each other across a gap can project uniform field strength due to typical construction features. Namely, electric current in winding portions beyond the ends of the iron cores can compensate almost perfectly for the fringing effects otherwise expected there. Replacing the electromagnet with permanent magnet materials constituting a pair of extruded "E", "U", or horseshoe shapes forming like-poles facing each other across a gap does not counter the fringing effects. Increasing the length of the extrusion somewhat beyond media dimensions can provide some compensation. This approach faces difficulties in a case where two such extruded magnet pairs are to be arranged at 90 degrees to each other and at 45 degrees to a media path for purposes of exposing the circularly-oriented media to a variety of magnetic field directions in a single pass.

Problems in fabrication or assembly also arise in the application of extruded permanent magnet shapes to large degaussing gaps. Namely, permanent magnet elements sized to the poles can be fabricated and magnetized in one piece, or they can be fabricated and magnetized in smaller pieces to be attached together into an extruded shape. One-piece fabrication for high coercivity, wide gap degaussing involves dies and magnetizing sources and fixtures of inordinate size. Extreme repulsive force impedes assembly of large magnets from smaller elements.

U.S. Pat. No. 5,666,413 issued Sep. 9, 1997 to Kempf for "Scrambler Of Information Stored On Magnetic Memory Media" specifies application of a single permanent magnet element for erasing thin magnetic storage media such as computer diskettes or floppy disks. U.S. Pat. No. 5,132,860 issued Jul. 21, 1992 to Von Stein for "Magnetic Media Erasure System" reveals various forms of permanent magnets, including complex shapes, extruded forms having like poles facing, and arrays intended to diminish magnetic strength upon passage of media.

SUMMARY OF THE INVENTION

This invention generally relates to information erasure by magnetic degaussing fields of effective strength and multi-dimensional direction applied to magnetic tapes and disks traversing a pathway. This invention particularly addresses erasure of small form factors having high coercivity, whether relatively thin or much thicker, within a single device without need for adjustment or reconfiguration. The invention may be configured for multiple-pass operation, requiring some operator skill and understanding of correct media manipulation, or for single-pass operation with effective improvements over prior art.

This invention relates to generation of single uniform fields, and to non-interacting systems of such fields, through the application of arrays of magnetic poles having simple geometry. Specifically, the arrays address problems of magnetic field uniformity arising from prior art application of extruded magnet shapes. Additionally, the arrays involve smaller elements than would be needed for extrusions, relieving difficulties in fabrication or assembly.

The strong, uniform magnetic fields generated by arrays of permanent magnet poles can be applied to degaussing wide ranges of magnetic media used to store information in various manners. For example, two non-interacting pole arrays can implement the familiar arrangement of fields at 90 degrees to each other and at 45 degrees to a media pathway, causing exposure to strength and range of direction with a single passage of media through that pathway. In applications sensitive to size, cost and weight that allow some operator skill and additional process time, a single array can be deployed with optimum performance achieved through multiple-pass technique. The media passing therethrough is uniformly exposed to the magnetic fields provided.

BRIEF DESCRIPTION OF THE DRAWINGS

These and other advantages of the present invention will be readily understood with reference to the following detailed description and attached drawings, wherein.

DETAILED DESCRIPTION OF THE PREFERRED EMBODIMENT

Figure 1:
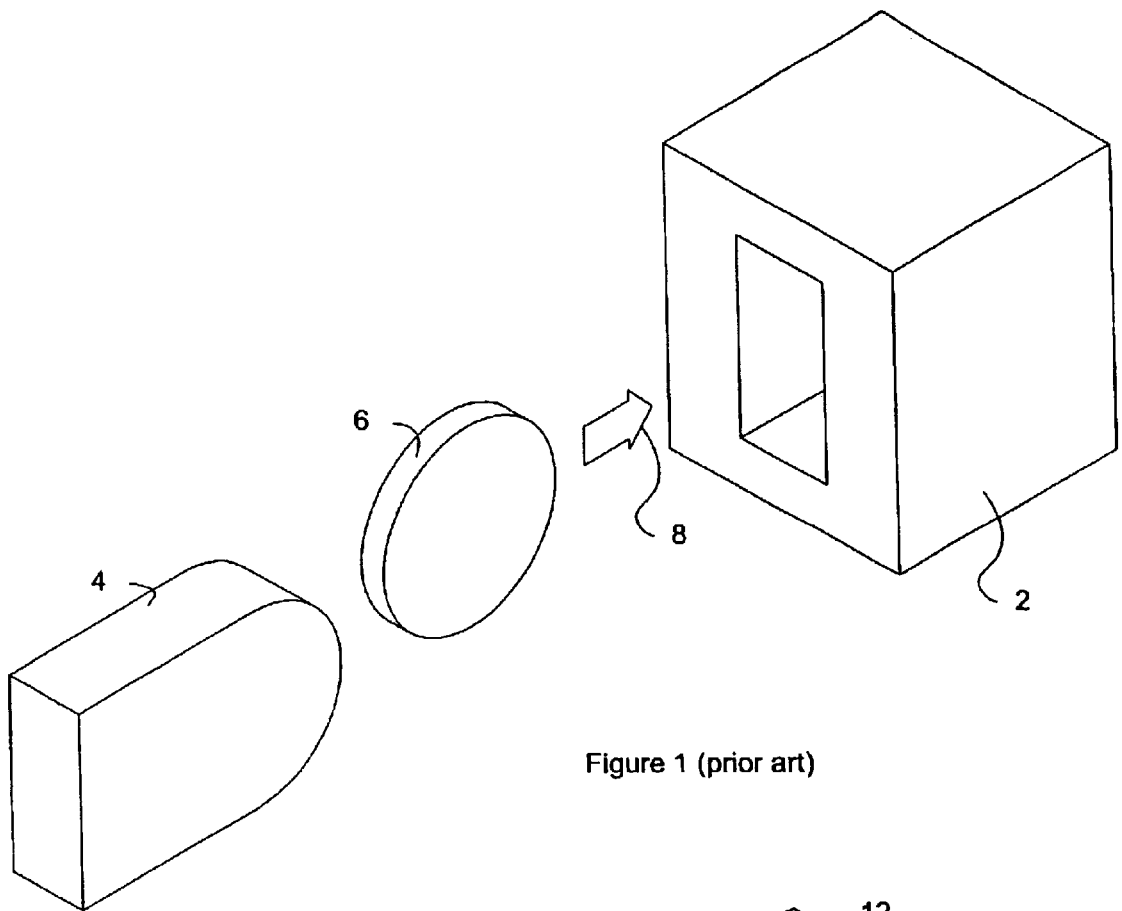
FIG. 1 represents in isometric view magnetic storage media approaching a bulk degausser in generalized form.

With reference to the drawings and particularly FIG. 1 in isometric view a generalized form is illustrated for housing 2 typical of prior art bulk degaussers employing permanent magnets. Also shown are generalized magnetic storage media like hard disk drive housing 4 and tape reel 6 approaching an opening in housing 2 in direction 8 for purposes of exposure to a magnetic field contained therein. Realize that most current tape media would actually be housed in square or rectangular cartridges or cassettes of somewhat larger size than reel 6. Realize also that actual dimensions of housing 6 depend both on the largest size of media to be treated plus any means provided to cope with attractive forces between media and the magnetic field, and on the amount of permanent magnet material needed to generate a magnetic field of sufficient strength to erase information on the media. Attractive force becomes especially troublesome in the case of disk drives, which contain ferromagnetic spindle and head motor components. The field strength needed generally relates to the coercivity specifications of media to be degaussed.

Figure 2:
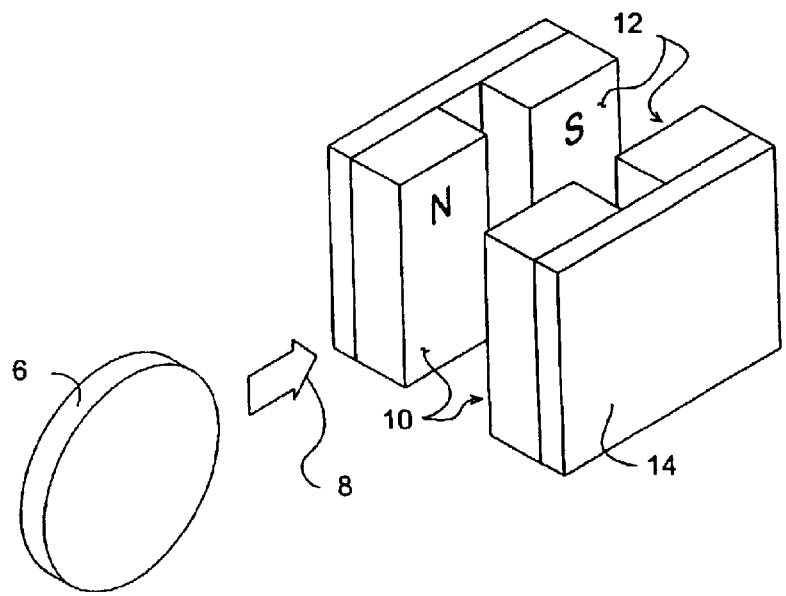
FIG. 2 represents in isometric form degaussing magnets of an extruded "U" shape housed within prior art bulk degaussers.

FIG. 2 represents in isometric view the prior art of deploying magnets of generally extruded form within housing 2 of FIG. 1 such that like North poles 10 and like South poles 12 face each other across the gap intended for passage of media 6 in direction 8. Such embodiments generally include elements 14 of high magnetic permeability and saturation flux density for the conduction of magnetic flux between North and South poles away from the gap.

Figure 3:
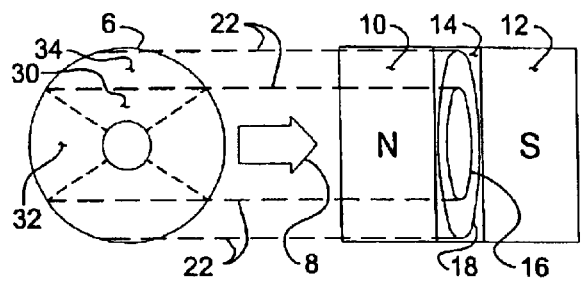
FIG. 3 represents a cross section through the degaussing gap of FIG. 2.

FIG. 3 illustrates in cross section midway across the degaussing gap of FIG. 2. North pole 10 and South pole 12 of one extruded magnet including flux conducting member 14 located behind the poles generate magnetic flux density contours of greater degaussing strength 16 encompassed due to fringing by lesser strength contour 18. The mid-plane contours generally represent weakest degaussing conditions and therefore worst-case of any plane parallel to the cross section across the degaussing gap. Within the contours shown or any other contour of significant degaussing strength, the poles direct flux primarily in the direction of arrow 8.

Pole dimensions near 2 inches by 4 inches approximate the diameter of a tape reel 6, which could be contained by a cartridge of the digital linear tape (DLT) format commonly used in data backup operations and specified with coercivities up to 1850 Oersteds. Some of the essentially circular tracks of such media processed in a single pass between poles of the extruded magnets forming a degaussing gap will pass through or at least approach the worst-case strength contours 16 and 18 and will experience corresponding strengths along horizontal projection lines 22. For example, if the gap is sized toward 2 inches to admit half-height hard disk drives in addition to DLT cartridges, tracks near one edge of half-inch wide tape in a one inch wide cartridge passing along the poles of either magnet must approach within 0.25 inches of the worst-case center plane. Those tracks will experience degaussing conditions not much better than that worst-case.

Different track segments at or near the worst-case center plane will experience very different degaussing conditions during a single pass through the pole configuration of FIG. 2 and FIG. 3. For example, segments within region 30 will experience strength greater than contour 16 nearly aligned with the tracks, which is the "easy" direction for erasure of information. Segments within region 34 will experience "easy" direction fields, but at strength less than contour 16. Segments within region 32 will experience the same strengths as region 30, but at directions tending toward perpendicular to the tracks, which is likely to degrade erasure performance in those regions. Obviously, much more uniform degaussing strength and varied field direction can be achieved with this arrangement by passing reel 20 through contours 10 and 12 twice, rotating the cartridge 90 degrees between passes. However, regions near the outside diameter can never experience greater strength of contour 18 applied in the "easy" direction, especially in the case of square or rectangular media like DLT.

Figure 4:
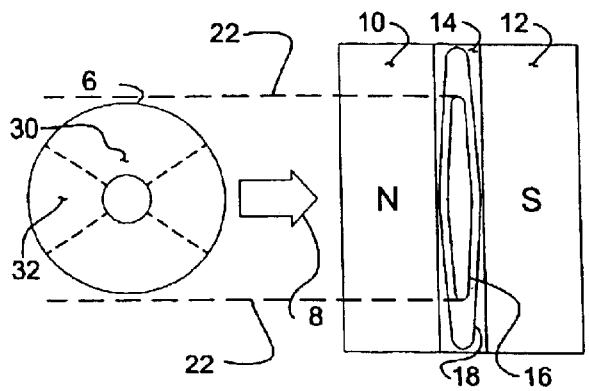
FIG. 4 represents poles formed by extruded "U" shapes or horseshoes of extrusion length greater than a typical diameter of small media form factor.

FIG. 4 illustrates the effect resulting from an increased extrusion length of poles 10 and 12 and the flux-conducting member 14 that connects them. Fringing effects remain, but flux density contours 16 and 18 widen with respect to size of target media 6. While increased pole length improves on strength uniformity at the cost of added material, size and weight, track segments within regions 30 and 32 continue to experience magnetic field strength predominately directed along tracks and perpendicular to them respectively. The present described embodiment provides for generation of single uniform fields, and to non-interacting systems of such fields, through the application of arrays of magnetic poles having simple geometry. Specifically, the arrays address problems of magnetic field uniformity arising from prior art application of extruded magnet shapes. Additionally, the arrays involve smaller elements than would be needed for extrusions, relieving difficulties in fabrication or assembly.

Figure 5:
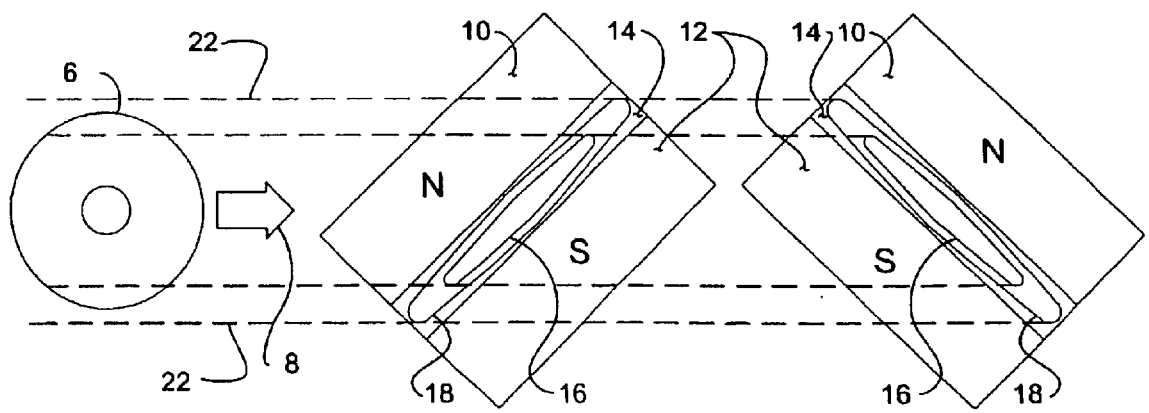
FIG. 5 represents poles sized as in FIG. 4 with an arrangement intended to yield single-pass, multi-directional exposure of media.

FIG. 5 illustrates the extruded magnets 10, 12, 14 arranged at 90 degrees to each other and at 45 degrees to path direction 8 for media 6, which exposes all regions to multiple directions of magnetic field in a single pass, but does not expose outer regions to the same high strength as inner regions. Improving on this non-uniformity using longer magnet extrusions costs added material, weight and size.

Figure 6:
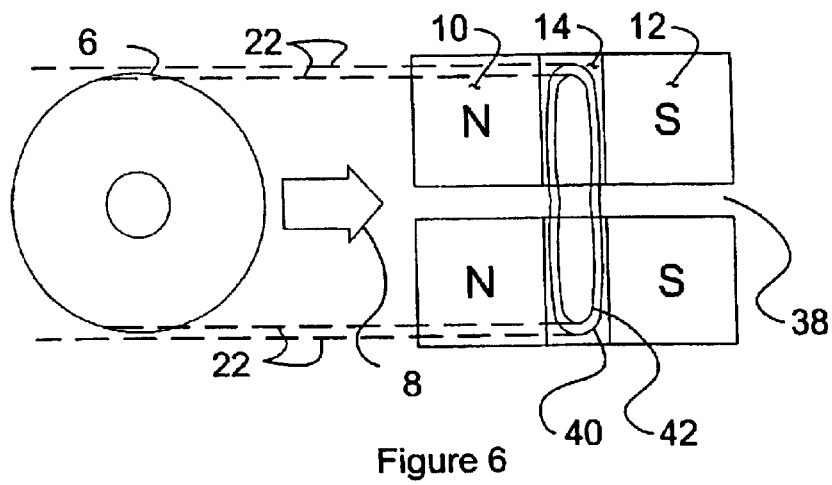
FIG. 6 discloses improvement over the field strength uniformity of FIG. 1 achieved by segmenting poles into an array of smaller poles.

Subdividing "U" extrusions of FIG. 2 and FIG. 4 into an array of two like-pole facing sets separated by an appropriate spacing 38, as shown in FIG. 6, yields more closely-spaced contours 40 and 42 of same relative if slightly weaker strength as contours 16 and 18. This array of two magnet pairs, or four poles on each side of the degaussing gap, improves on two-pass strength uniformity over the configuration shown in FIG. 1 with no added material. It uses standard-size magnet elements and magnetizing fixtures, which can then be assembled into a configuration that does not need to contain the extreme repulsive force that would be needed to contact the separate elements. By comparison of FIG. 3 and FIG. 6; or FIG. 4 and FIG. 6, with the same amount of materials in FIG. 3 and FIG. 6, the field contours illustrate a slightly weaker maximum strength everywhere in the media, but it is a more uniform strength everywhere within FIG. 4 and FIG. 6 relative to FIG. 3. The relative strength of 42 and 40 would be the same as the relative strength of 18 and 16, and the absolute values would not drop for using the same amount of material covering the entire medium more uniformly. Since the fringing effects cause non-uniformity of the field strength, simply having the magnet extend to the extremes of the medium is inadequate. It should be appreciated therefore that it is better to cover the entire media with slightly weaker contour 42 and get all the tape exposed to that strength 42 in a more beneficial direction.

Figure 7:
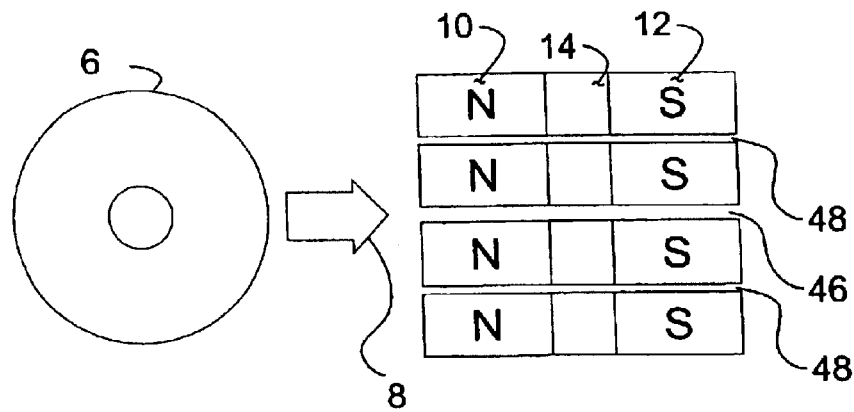
FIG. 7 discloses additional segmentation of poles into a larger array of smaller size elements.

FIG. 7 illustrates additional subdivision of magnets into an array of four North poles and four South poles. Optimum enhancement of uniformity involves greater separation 46 between the two inner elements than separation 48 between each inner element and its adjacent outer element. Furthermore, if the pole pieces 10 and 12 of FIG. 6 are of standard size 2 inch squares by 1 inch deep in the direction perpendicular to that figure, then double that number of same sized pieces magnetized in a of FIG. 7. This fact simplifies manufacture of different degaussers with different strengths for different applications.

It will be appreciated that more elements could be added to the magnet arrangements of FIG. 6 or FIG. 7 in order to lengthen the field, and two such arrays could then be configured similar to the arrangement of FIG. 5 for one-pass degaussing with uniformity improved upon that arrangement. In addition, means such as a guide pathway with adaptations within a defined gap relative to adjacent magnetic poles may facilitate passage of media through magnetic fields of uniform strength in the direction parallel to the guide pathway.

Figure 8:
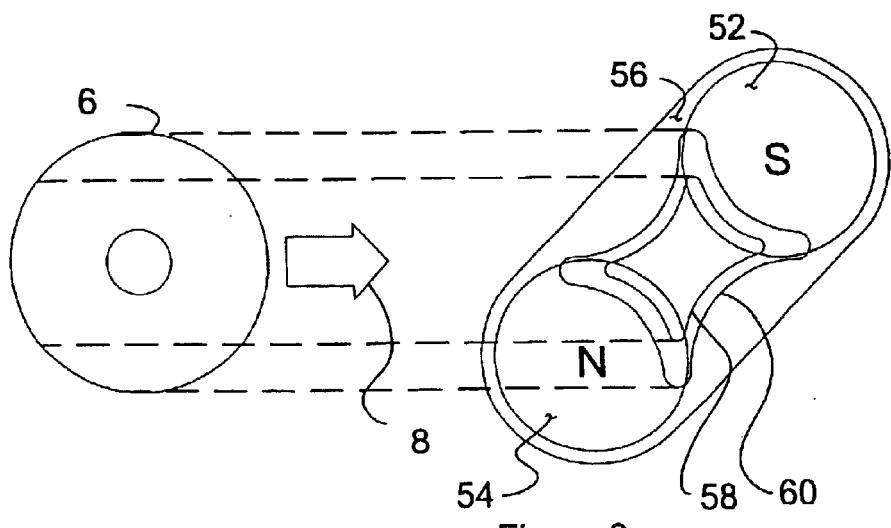
FIG. 8 represents a multi-directional field produced by circular poles.

Degaussing magnet poles, whether of the electrical or permanent magnet type, need not be of the extruded or segmented extrusion arrangements described in FIG. 1 through FIG. 7. For example, a set of circular like-poles facing magnets including South pole 52, North pole 54, and flux conducting member 56 seen in cross section of FIG. 8, produces worst-case mid-plane strength contours of irregular shape like stronger inner contour 58 and weaker outer contour 60. Being of irregular shape, each contour contains magnetic strength of varying direction, which in turn can expose many regions of media 6 traversing in direction 8 to multiple field directions in a single pass. However, even with the addition of the second magnet assembly configuration of FIG. 8 (52, 54, 56) oriented at a 90 degree angle relative to a first magnet assembly, e.g., similar to the arrangement of FIG. 3, the overall configuration still may not be optimized to provide an effective one-pass degausser using 3 inch diameter poles to treat both 4 inch DLT reels and high-coercivity half-height disk drives. Simply increasing the pole length beyond 2 inches in the direction perpendicular to the cross section yields rapidly diminishing returns.

Figure 9:
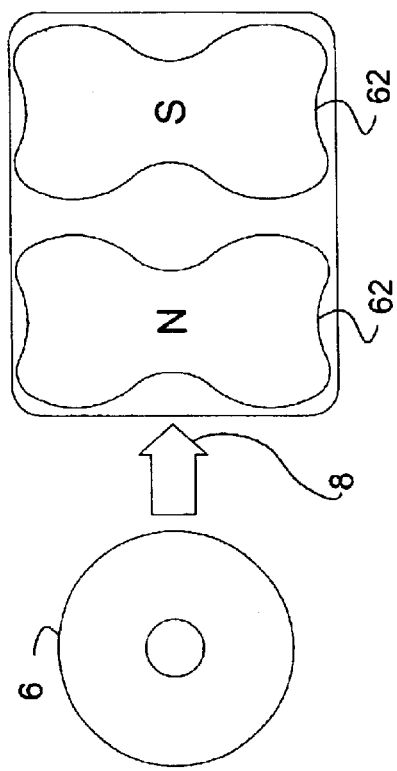
FIG. 9 represents irregular pole shapes able to produce a highly uniform, singly-directed magnetic field.

Complex shapes 62, like the "bone-pole" magnet shown in FIG. 9, can address the fringing problem by placing more pole surface toward the edges of degaussing pathway 8. That shape obviously incurs expenses such as for a large fabrication die and magnetizing fixture for a permanent magnet embodiment, but the arrays of four standard-size 3-inch diameter circular poles 64 and 66 shown in FIG. 10 yield approximate equivalency to an optimized bone-shaped pole.

Figure 10:
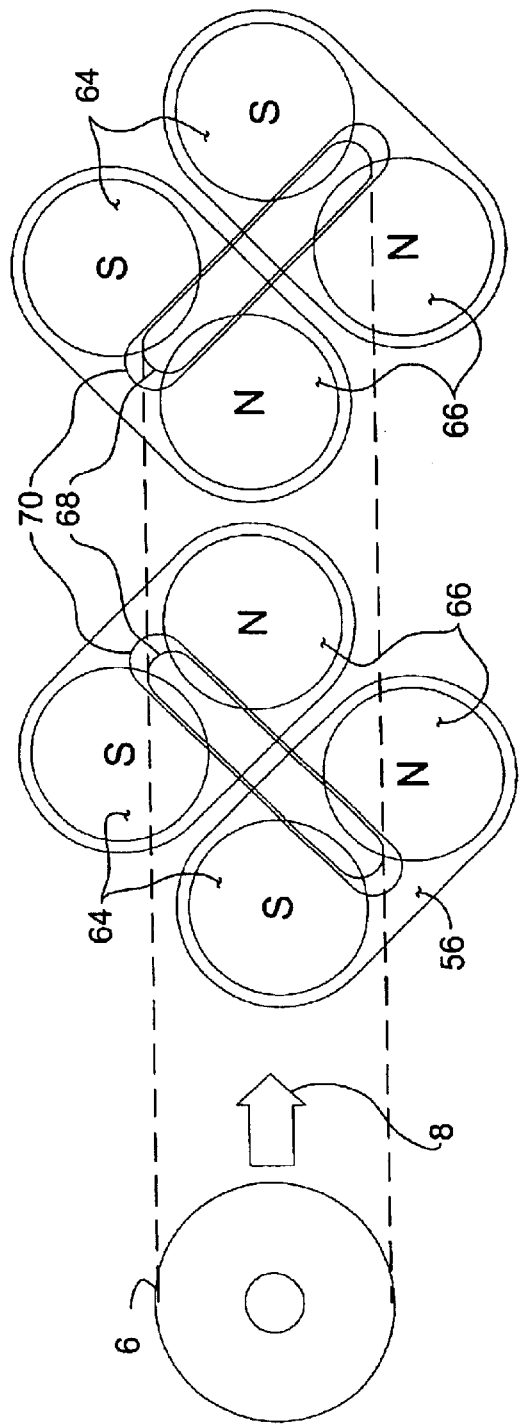
FIG. 10 discloses circular poles arrayed to produce uniform field strength and multiple directions for single-pass degaussing.

The circular poles of FIG. 10 can be spaced to yield uniformly strong, unidirectional fields as indicated by proximity of stronger inner contour 68 to weaker outer contour 70. For about the same cost in material, weight and size, the arrangement with arrays of circular poles generating fields at 90-degree angles to each other and at 45-degree angles to the direction of media passage 8 yields a one-pass degaussing process with a higher degree of uniformity and more predictable performance than the arrangement of FIG. 5. Availability of standard elements and relief against extreme repulsive forces during assembly continue as major benefits of circular pole arrays.

Figure 11:
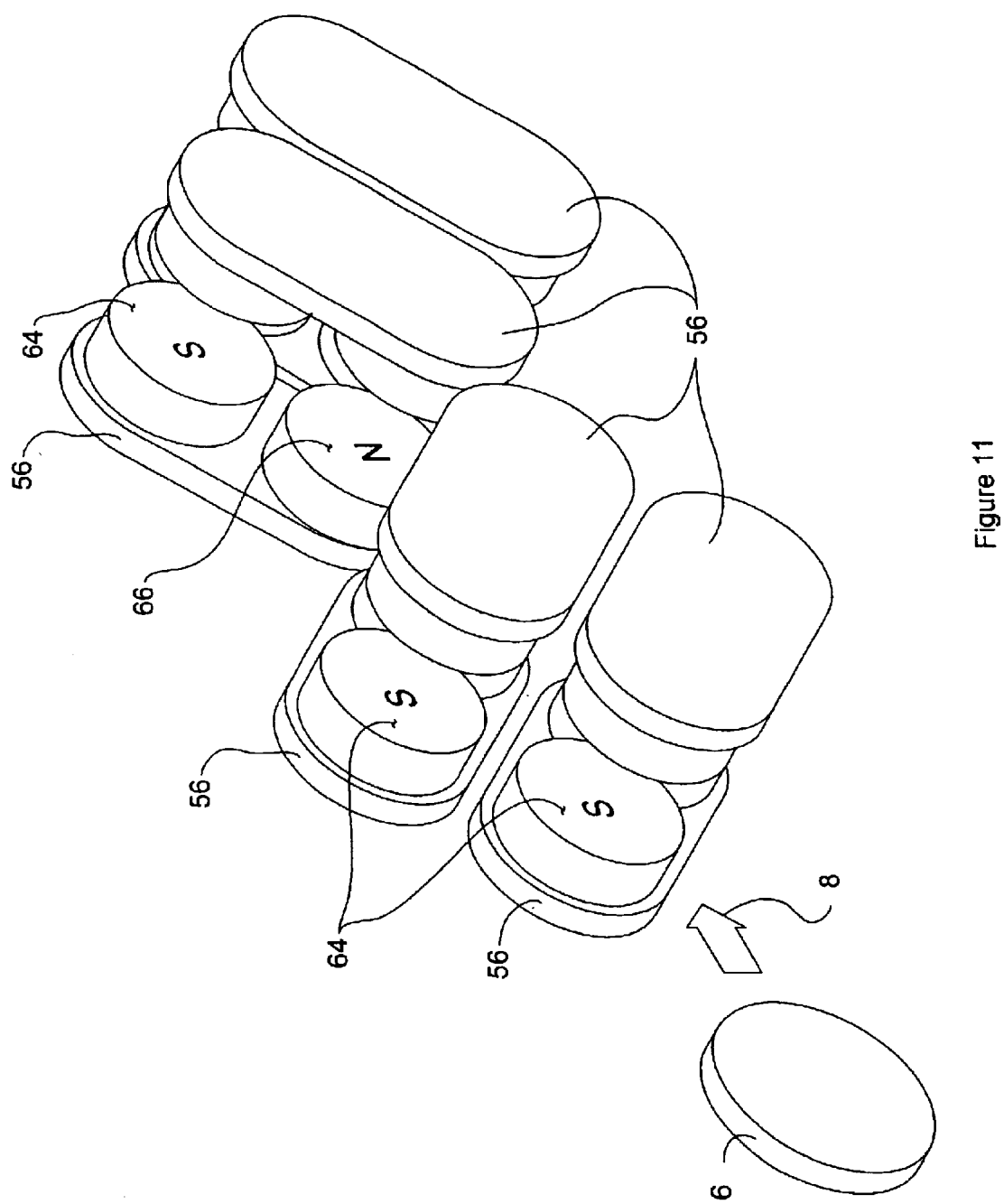
FIG. 11 illustrates the magnet elements of FIG. 10 in isometric view.
Figure 12:
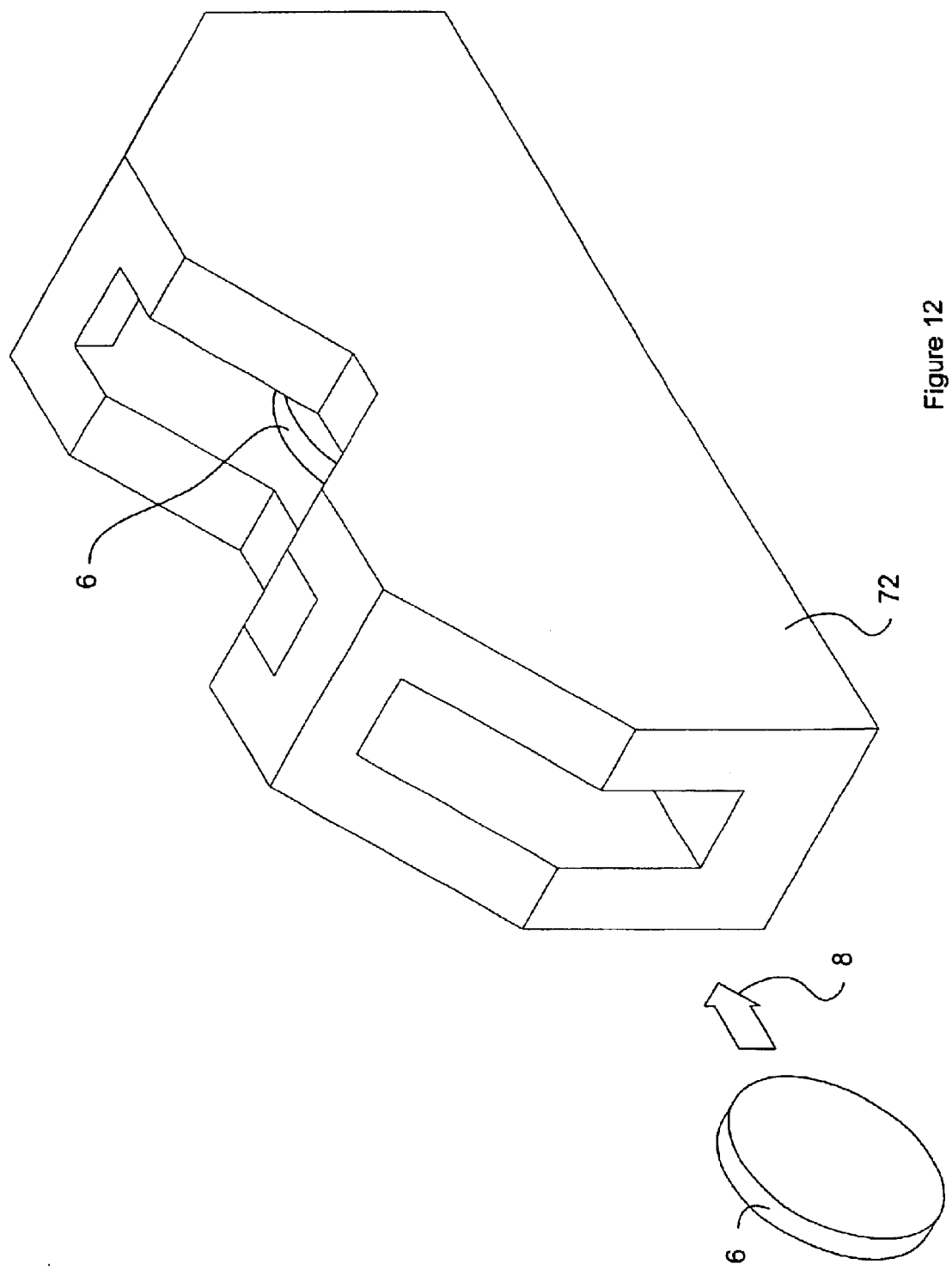
FIG. 12 illustrates a housing shape suited to the magnet elements of FIG. 11.

FIG. 11 illustrates the array of circular like-poles facing magnets of FIG. 10 in isometric view. FIG. 12 illustrates in isometric view housing means for the magnet arrangement of FIG. 10 and FIG. 11 providing both access at various positions for manually passing media 6 through the degaussing gap in direction 8, and bridging means for containing the magnet assemblies about the gap against the repulsive force of the like-poles facing arrangement.

Of course many variations on the arranging of square, rectangular or circular pole arrays can be practiced for purposes of improving on the non-uniform field strength produced by extrusion shapes common to the art of bulk degaussing. Although not standard die shapes, pentagonal or hexagonal poles would approximate the results of quadrilateral or circular pole arrays. Irregular shapes commonly available for small brushless motors could be scaled up to achieve similar results, again at the expense of a large set of die and magnetizing fixture.

Application of arrays of poles need not be restricted to like-pole facing magnet systems. This invention can relate to unlike-poles facing configurations, "platform" arrangements with poles only on one side of the media pathway, arrangements of poles partially overlapping for purposes of generating field components perpendicular to the gap, poles on more than two sides of a degaussing gap, and combinations of such arrangements.

Adjustment means such as changes in gap width to expose thinner media to stronger magnetic fields can also be added to embodiments of the invention.

What is claimed is:

1. A bulk degaussing apparatus for erasing various sizes of magnetic media, comprising:
   a first plurality of fixed magnetic North-North poles connected by ferromagnetic material to a plurality of fixed magnetic South-South poles predisposed on a first plane;
   a second plurality of fixed magnetic North-North poles connected by ferromagnetic material to a plurality of fixed magnetic South-South poles predisposed on a second plane parallel to and facing poles on said first plane defining a gap therebetween; and
   said first plurality and said second plurality defining an arrangement of poles so that adjacent poles interact to counteract fringing effects.

2. A bulk degaussing apparatus as described in claim 1, including guide pathway in said gap relative to said poles for passage of media through magnetic fields of uniform strength in direction parallel to said guide pathway.

3. A bulk degaussing apparatus for erasing various sizes of magnetic media, comprising:
   a first plurality of fixed magnetic North-North poles connected by ferromagnetic material to a plurality of fixed magnetic South-South poles predisposed on a first plane;
   a second plurality of fixed magnetic North-North poles connected by ferromagnetic material to a plurality of fixed magnetic South-South poles predisposed on a second plane parallel to and facing poles on said first plane defining a gap therebetween;
   said first plurality and said second plurality defining an arrangement of poles so that adjacent poles interact to counteract fringing effects;
   arrangement that projects separate non-interacting multiples of bulk degaussing magnetic fields into said gap in different directions; and
   a guide pathway in said gap relative to said poles for passage of media through magnetic fields of uniform strength of directions different to said guide pathway.

4. A bulk degaussing apparatus as described in claims 3, wherein the members of the array of poles have essentially circular shape.

5. A bulk degaussing apparatus as described in claims 3, wherein the members of the array of poles have essentially square or rectangular shape.

6. A bulk degaussing apparatus as described in claims 3, wherein the members of the array of poles have irregular, ovoid or polygonal shape.

7. A bulk degaussing method for erasing various sizes of magnetic media, comprising:
   providing a first plurality of fixed magnetic North-North poles connected by ferromagnetic material to a plurality of fixed magnetic South-South poles predisposed on a first plane;
   providing a second plurality of fixed magnetic North-North poles connected by ferromagnetic material to a plurality of fixed magnetic South-South poles predisposed on a second plane parallel to and facing poles on said first plane defining a gap therebetween; and
   arranging the first plurality and the second plurality of poles so that adjacent poles interact to counteract fringing effects.

8. A bulk degaussing method as described in claim 7, including guide pathway in said gap relative to said poles for passage of media through magnetic fields of uniform strength in direction parallel to said guide pathway.

9. A bulk degaussing method as described in claim 7, comprising:
   arrangement that projects separate non-interacting multiple magnetic fields into said gap in different directions; and
   guide pathway in said gap relative to said poles for passage of media through magnetic fields of uniform strength of directions different to said guide pathway.

10. A bulk degaussing method as described in claims 7, comprising providing the members of the array of poles have essentially circular shape.

11. A bulk degaussing method as described in claims 7, comprising providing the members of the array of poles have essentially square or rectangular shape.

12. A bulk degaussing method as described in claims 7, comprising providing the members of the array of poles have irregular, ovoid or polygonal shape.

* * * * *

UNITED STATES PATENT AND TRADEMARK OFFICE
CERTIFICATE OF CORRECTION

PATENT NO. : 6,714,398 B2
DATED : March 30, 2004
INVENTOR(S) : Schultz, Robert A.

It is certified that error appears in the above-identified patent and that said Letters Patent is hereby corrected as shown below:

Column 2,
Line 44, change "form", to -- view --.
Lien 57, change "FIG. 1", to -- FIG. 3 --.

Column 3,
Line 19, change "housing 6", to -- housing 2 --.

Column 4,
Line 12, change "reel 20", to -- reel 6 --.
Line 13, change "contours 10 and 12", to -- contours 16 and 18 --.
Lines 13-14, change "cartridge 90 degrees", to -- reel 90 degrees --.
Line 41, change "FIG. 2" to -- FIG. 3 --.
Line 48, change "FIG. 1" to -- FIG. 3 --.

Column 5,
Line 9, after "in a", insert -- 2 inch dimension rather than the 1 inch dimension can serve in the configuration --.
Line 34, change "of the", to -- of a --.
Line 37, change "FIG. 3", to -- FIG. 5 --.
Line 65, change "housing means", to -- housing means 72 --.

Signed and Sealed this

Twelfth Day of April, 2005

JON W. DUDAS
*Director of the United States Patent and Trademark Office*